US010314023B2

(12) United States Patent
Stattin et al.

(10) Patent No.: US 10,314,023 B2
(45) Date of Patent: Jun. 4, 2019

(54) METHOD AND APPARATUS FOR EXTENDING SIGNALING IN A WIRELESS COMMUNICATION NETWORK

(71) Applicant: Telefonaktiebolaget LM Ericsson (publ), Stockholm (SE)

(72) Inventors: Magnus Stattin, Upplands Väsby (SE); Gunnar Bergquist, Kista (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 82 days.

(21) Appl. No.: 15/112,703

(22) PCT Filed: Jan. 19, 2015

(86) PCT No.: PCT/IB2015/050394
§ 371 (c)(1),
(2) Date: Jul. 20, 2016

(87) PCT Pub. No.: WO2015/110948
PCT Pub. Date: Jul. 30, 2015

(65) Prior Publication Data
US 2016/0345302 A1 Nov. 24, 2016

Related U.S. Application Data

(60) Provisional application No. 61/930,366, filed on Jan. 22, 2014.

(51) Int. Cl.
*H04W 4/00* (2018.01)
*H04W 72/04* (2009.01)
*H04W 28/18* (2009.01)

(52) U.S. Cl.
CPC ........ *H04W 72/042* (2013.01); *H04W 28/18* (2013.01); *H04W 72/0413* (2013.01)

(58) Field of Classification Search
CPC ............. H04W 72/042; H04W 28/18; H04W 72/0413; H04W 76/021
(Continued)

(56) References Cited

U.S. PATENT DOCUMENTS

2013/0034085 A1* 2/2013 Bostrom ........... H04W 56/0045
370/336
2014/0321271 A1* 10/2014 Bonnier ........... H04W 28/0215
370/230
(Continued)

FOREIGN PATENT DOCUMENTS

WO 2009054655 A2 4/2009

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.4.0, Dec. 2013, 1-57.
(Continued)

*Primary Examiner* — Sai Ming Chan
(74) *Attorney, Agent, or Firm* — Sage Patent Group

(57) ABSTRACT

In one aspect, the teachings herein provide a new mechanism for signaling in a manner that makes advantageous use of preexisting identifiers that are defined for a communication network by an applicable communication standard or protocol according to a "standard" use, by temporarily repurposing one or more such identifiers for an alternate use differing from the standard use. For example, a network base station or other node knows or learns that a given wireless device operating in the network is compatible with the alternate use, selects a given one of the identifiers and temporarily repurposes its for an alternate use, e.g., where the alternate use provides a new signaling mechanism between the network and the compatible device. These
(Continued)

operations include limiting the repurposing to occasions involving compatible devices and avoiding avoid conflicts with standard usage involving non-compatible devices.

17 Claims, 6 Drawing Sheets

(58) Field of Classification Search
USPC .......................................................... 370/329
See application file for complete search history.

(56) References Cited

U.S. PATENT DOCUMENTS

2015/0009936 A1* 1/2015 Quan ................... H04W 74/008
370/329
2016/0119943 A1* 4/2016 De Benedittis ... H04W 72/1257
370/311

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.0.0, Dec. 2013, 1-57.
3GPP, "3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, 1-60.
Unknown, Author, "LCID for Scheduling Information", 3GPP TSG-RAN WG2 Meeting #61, R2-080680, R2-073909, Nokia Corporation, Nokia Siemens Networks, Sorrento, Italy, Feb. 11-15, 2008, 1-2.
Unknown, Author, "Signalling of UE Power Preference Indication", 3GPP TSG-RAN2 Meeting #79, R2-123964, Intel Corporation, Qingdao, China, Aug. 13-17, 2012, 1-6.

* cited by examiner

| Index | LCID values |
|---|---|
| 00000 | CCCH |
| 00001-01010 | Identity of the logical channel |
| 01011-11001 | Reserved |
| 11010 | Long DRX Command |
| 11011 | Activation/Deactivation |
| 11100 | UE Contention Resolution Identity |
| 11101 | Timing Advance Command |
| 11110 | DRX Command |
| 11111 | Padding |

*PRIOR ART*
*FIG. 1*

| Index | LCID values |
|---|---|
| 00000 | CCCH |
| 00001-01010 | Identity of the logical channel |
| 01011 | CCCH |
| 01100-10111 | Reserved |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

*PRIOR ART*
*FIG. 2*

| Index | Size of Length field (in bits) |
|---|---|
| 0 | 7 |
| 1 | 15 |

PRIOR ART
FIG. 3

| Index | LCID values |
|---|---|
| 00000 | MCCH (see note) |
| 00001-11100 | MTCH |
| 11101 | Reserved |
| 11110 | MCH Scheduling Information |
| 11111 | Padding |

NOTE: If there is no MCCH on MCH, an MTCH could use this value.

PRIOR ART
FIG. 4

METHOD AND APPARATUS FOR EXTENDING SIGNALING IN A WIRELESS COMMUNICATION NETWORK

TECHNICAL FIELD

The present invention relates to wireless communication networks and their controlling standards, and particularly relates to extending the signaling defined by such standards.

BACKGROUND

In communication networks, such as networks based on Long Term Evolution, LTE, as specified by the Third Generation Partnership Project, 3GGP, there are certain data layer functions designed for mass communication with a large number of wireless devices, referred to as "user equipments" or UEs in the 3GPP lexicon. In particular, some data layer functions are designed for peer-to-peer control of transport channels and for the mapping between transport channels and logical channels. Example functions include those used by the Radio Resource Control, RRC, protocol and the Medium Access Control, MAC, sublayer in 3GPP LTE.

According to the Evolved Packet System or EPS defined by the 3GPP LTE architecture, the radio access network is referred to as an Evolved Universal Terrestrial Radio Access Network, or E-UTRAN. The E-UTRAN includes base stations, referred to as eNodeBs or eNBs that provide E-UTRA user-plane and control-plane protocol terminations towards the UEs. User-plane protocol examples include Packet Data Convergence Protocol or PDCP, Radio Link Control or RLC, MAC, and Physical Layer or PHY, while control-plane protocol examples include RRC.

The eNBs are connected by means of an "S1" interface to core network, which is referred to as an Evolved Packet Core or EPC. More specifically, the eNBs have S1 connections to a Mobility Management Entity, MME, through an S1-MME interface and to a Serving Gateway, S-GW, through an S1-U interface. Upon request from an MME, an eNB performs an E-RAB to radio bearer mapping and establishes a Data Radio Bearer and allocates the required resources on the air interface, referred to as the "Uu" interface. The eNB also sets up a logical channel for the UE and allocates it to a transport channel. These operations involve the MAC layer.

3GPP specifies the E_UTRAN MAC protocol as a sub layer of layer 2. Functions of the MAC sub layer are performed by MAC entities in the UE and in the E-UTRAN. For a MAC entity configured at the eNB, there is a peer MAC entity configured at the UE and vice versa.

The mapping of logical channels to transport channels at the MAC sublayer is configured by RRC. There is one Logical Channel Identifier, LCID, field for each MAC service data unit, SDU, included in the corresponding MAC protocol data unit, PDU. The LCID field size is 5 bits, where the values 00000 and 01011 are reserved for CCCH and the value 11111 is reserved for padding. The LCID for the Downlink Shared Channel, DL-SCH, uses the range 11011-11110 for MAC Control Elements, MAC CEs. A MAC CE is an explicit MAC inband control message. The range 01011-11001 is reserved for future needs within the framework of the controlling standard. Similarly, the LCID for the Uplink Shared Channel, UL-SCH, uses the range 11000-11110 for explicit MAC inband control, while the range 01100-10111 is reserved for future needs within the standard.

Further, the LCID values that are predefined for use in identifying logical channels in the MAC sublayer is 00001-01010. From within this range, the LCID values of 00001 and 00002 are reserved for the signaling radio bearers used by RRC. Consequently, there are eight LCID values available for mapping logical channels to data radio bearers.

These and other details can be seen in the below tables, excerpted from 3GPP TS 36.321,V12.4.0 (2015-01). In particular, FIG. 1 depicts "Table 6.2.1-1 Values of LCID for DL-SCH", FIG. 2 depicts "Table 6.2.1-2 Values of LCID for UL-SCH", FIG. 3 depicts "Table 6.2.1-3 Values of F field", and FIG. 4 depicts "Table 6.2.1-4 Values of LCID for MCH".

From the above information and excerpted tables, one sees that in the example context of LTE, there is a relatively scarce range of LCID values within the predefined set(s) of LCID values. Moreover, one sees that the standard tightly controls the meaning and use of the LCID values. As a general proposition, conformance to these default meaning or mappings is required for proper operation between the network and the wireless devices. Moreover, to the extent that one might wish to deviate from or expand these default mappings, standardizing new LCIDs for MAC control or other purposes is a slow, cumbersome process.

SUMMARY

In one aspect, the teachings herein provide a new mechanism for signaling in a manner that makes advantageous use of preexisting identifiers that are defined for a communication network by an applicable communication standard or protocol according to a "standard" use, by temporarily repurposing one or more such identifiers for an alternate use differing from the standard use. For example, a network base station or other node knows or learns that a given wireless device operating in the network is compatible with the alternate use, selects a given one of the identifiers and temporarily repurposes its for an alternate use, e.g., where the alternate use provides a new signaling mechanism between the network and the compatible device. These operations include limiting the repurposing to occasions involving compatible devices and avoiding avoid conflicts with standard usage involving non-compatible devices.

In an example embodiment, a network node, such as a base station, is configured for operation in a wireless communication network and includes a communication interface and an associated processing circuit. The communication interface is configured for transmitting downlink signals to wireless devices and receiving uplink signals from wireless devices, and, with respect to at least one wireless device, the processing circuit is configured to select an identifier from among a set or range of identifiers that are reserved according to a controlling standard for use by the network node in identifying any one or more of secondary cell groups, secondary cells, radio bearers and logical channels. The reserved use is referred to herein as a "standard use" and, advantageously, the processing circuit is configured to assign an alternate use to the selected identifier. Here, the alternate use is known by or signaled to the at least one wireless device. Correspondingly, the processing circuit is configured to use the selected identifier according to the alternate use, rather than the standard use, in one or more communications with the at least one wireless device.

In another embodiment, an example wireless device includes a communication interface configured for receiving downlink signals from base stations in a wireless communication network and transmitting uplink signals to base stations in the wireless communication network. Further, the wireless device includes a processing circuit that is operatively associated with the communication interface and configured to assign an alternate use to a selected identifier, where the alternate use is known by or signaled to the wireless device. Further, the selected identifier is one among a set or range of identifiers that are reserved according to a controlling standard for use in identifying any one or more of secondary cell groups, secondary cells, radio bearers and logical channels. Such use is referred to as a standard use and the processing circuit of the wireless device is configured to use the selected identifier according to the alternate use, rather than the standard use, in one or more communications with a base station.

The above-described network node and wireless device each may be referred to broadly as types of wireless communication apparatuses, e.g., one being a first wireless communication apparatus and one being a second wireless communication apparatus. Here, it will be appreciated that the contemplated alternate, non-standard use of a selected identifier for signaling extensions not defined by the applicable controlling standard(s) requires that all of the wireless communication apparatuses involved in the alternate use be aware of such use, so that there is a common understanding between them as to how the selected identifier is being used. Consequently, some embodiments herein involve a method implemented at a first wireless communication apparatus that is in communication with a second wireless communication apparatus. The first wireless communication apparatus for example is one of a network node or a wireless device and the second wireless communication apparatus is the other one of the network node or the wireless device.

The method includes the first wireless communication apparatus assigning an alternate use to a selected identifier. The alternate use is known by or signaled to the first wireless communication apparatus, and the selected identifier is one among a set or range of identifiers that are reserved according to a controlling standard for use in identifying any one or more of secondary cell groups, secondary cells, radio bearers and logical channels, which use is referred to as a standard use. The method further includes using the selected identifier according to the alternate use in one or more communications with at least one second wireless communication apparatus.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 1-4 are tables providing known example information for using Logical Channel Identifiers or LCIDs, for mapping logical channels to data radio bearers according to the standard usage of LCIDs defined by 3GPP TS 36.321.

DETAILED DESCRIPTION

Figure 5:
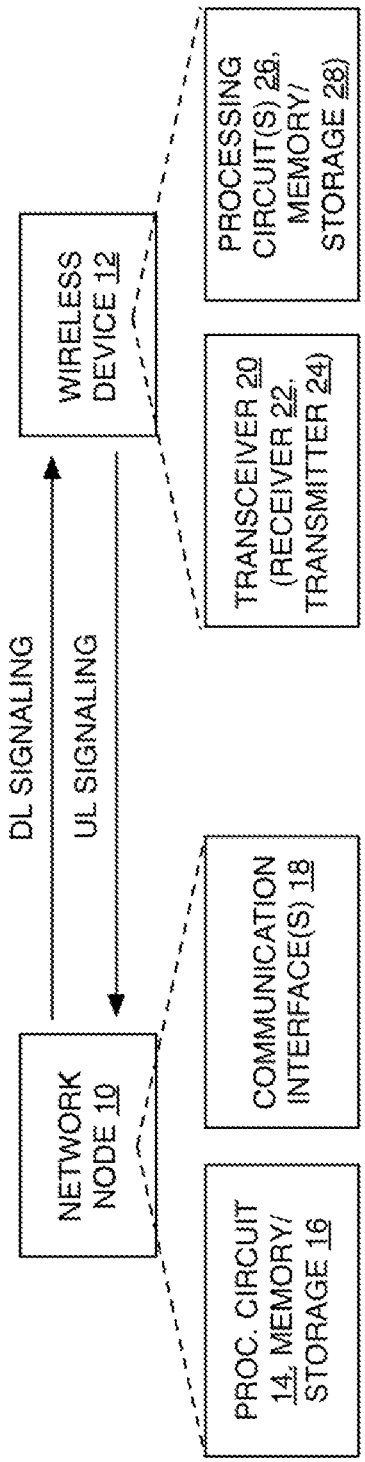
FIG. 5 is a block diagram of one embodiment of a network node and a wireless device configured according to the teachings herein.

Before turning to the illustrations, consider an example case where an eNodeB, eNB, reserves a Logical Channel Identity, referred to as an LCID, from a set of LCIDs that are predefined or otherwise specified for use in identifying Logical Channels at the MAC layer. Here, it will be appreciated that the eNB operates according to a controlling standard or technical specification that conventionally defines and restricts use of the LCIDs by the eNB to the "standard use" defined in the specification. It will also be appreciate that "reserving" means reserving or otherwise designating or selecting the LCID for an alternate use.

The alternate use differs from the use specified by the controlling standard. That is, the controlling standard specifies that the LCID be used for identifying logical channels at the MAC layer or sub-layer, but, according to the teachings herein, the selected LCID is put to an alternate use at least temporarily.

The alternate use extends the signaling functionality between the network and a wireless device that is compatible with the alternate use, such as by allowing custom or new MAC control elements to be sent, or by otherwise allowing new or extended signaling, containers, etc., to be exchanged between eNB and the compatible wireless device. Advantageously, the eNB refrains from using the selected LCID for mapping EPS Bearers onto Radio Bearers. That is, the eNB avoids putting the selected LCID to its standard use when the alternate use is active. In one or more embodiments, the alternate use occurs on LCIDs specified for use or association with Data Radio Bearers, or as the layer where the repurposing sees it, the Dedicated Traffic Channels or DTCHs. Further, in at least one embodiment, if the selected LCID is specified for use or association with a Signaling Radio Bearer, SRB, the eNB refrains from activating this SRB.

Broadly, when a LCID from the defined set or range is not being used for its standard use—e.g., when not mapped to an EPS bearer—the eNB can advantageously re-define or repurpose that LCID for some alternate use and do so without introducing incompatibility with the controlling standard(s). The LCID selected for alternate use can be used in any number of ways, including these non-limiting examples: to define a new control element, a new control signaling message, a new container or data element, or a new logical channel. Here, the word "new" denotes a custom, non-standard use that is not defined by the applicable controlling standard More broadly, it will be appreciated that the re-purposed LCID extends the signaling support between the network and the wireless device.

In another example, if the eNB is the target of an incoming handover of a wireless device that supports LCID reuse and for which the LCID subject to reuse is associated with or corresponds to a Radio Bearer and/or an EPS bearer, the eNB can allow or otherwise enable the LCID reuse by reconfiguring or otherwise remapping the Radio Bearer and/or EPS Bearer to map them onto a different LCID. Here, an EPS bearer may be remapped on a different Radio Bearer. Of course, the eNB also may be configured to refrain from reusing the LCID in question and it can, for example, select another LCID to re-purpose for the alternate use.

On the device side, a wireless device, e.g., a "UE" using 3GPP terminology, that supports LCID reuse may determine that reuse is not supported by an eNB, or is otherwise not active, based on recognizing that a given LCID is mapped to or otherwise associated with an EPS Bearer and/or a Radio Bearer.

Additionally, it is contemplated herein to configure an eNB to determine or learn whether a given wireless device supports LCID reuse. Correspondingly, it is also contemplated herein to configure a UE or other wireless device to determine or learn whether a given eNB supports LCID reuse. Thus, either side—the network or the device—may determine or learn about the other's ability to support LCID reuse, such as by any one or more of: (a) receiving/detecting use of an LCID not used for or associated with a Radio Bearer and/or EPS Bearer; (b) receiving/detecting a special signature or pattern or string in a special location, message or structure; e.g., in padding or by associating a new meaning to existing or new signaling or a new procedure; and (c) detecting that the eNB or wireless device is of a particular release, version, model or make, such as through broadcasted system information or through wireless device capability signaling.

Thus, an eNB may inform or indicate to a wireless device that it supports LCID reuse by any one or more of: (a) using or transmitting or otherwise indicating an LCID that is not associated with or mapped to a Radio Bearer and/or EPS Bearer; (b) using or transmitting/indicating a special signature or pattern or string in a special location, message or structure, such as in padding or by associating a new meaning to existing or new signaling or procedure; and (c) informing or indicating that the eNB is of a particular release, version, model or make, such as through broadcasted system information.

Further, it is also contemplated herein that compatibility information regarding identifier reuse, including the exchange of specific details on what reuse functionality is supported, may be based on the exchange of RRC messages or information elements. For example, the following actions may be performed via RRC signaling: (a) an eNB may inform a wireless device that it supports reusing a logical channel for extended signaling support; (b) an eNB may inform a wireless device that it will reuse a logical channel for extended signaling support; (c) a wireless device may inform an eNB that it supports reusing a logical channel for extended signaling support; (d) a wireless device may inform an eNB that it will reuse a logical channel for extended signaling support; and (e) the structure and meaning of the extended signaling support may be exchanged.

It is further contemplated herein to enhance the above signaling or information exchanges via the use of acknowledgements. For example, in response to an eNB indicating its support for identifier reuse, the wireless device can acknowledge that indication by transmitting or indicating an identifier that is not in use for its standard purpose, e.g., by transmitting an LCID that is reserved for use in identifying logical channel but is not currently associated with or mapped to an EPS Bearer and/or a Radio Bearer. The same acknowledgement mechanism may be used at the eNB with respect to a wireless device. Other acknowledgement mechanisms include using, transmitting or otherwise indicating a special signature, pattern, or string in a special location, message or structure. For example, by padding or by associating a new meaning to existing or new signaling or procedures.

In at least some embodiments, additional robustness is achieved by using a secondary acknowledgment sent from a wireless device to an eNB, or vice versa. According to this mechanism, the first entity indicates its support of identifier reuse to the second entity, the second entity acknowledges that support, and the first entity acknowledges the acknowledgement. Here, the first entity is the eNB or the wireless device and the second entity is the wireless device or the eNB. Use of the secondary acknowledgment prevents problems that might otherwise arise in the event of one entity mis-detecting that the other entity supports identifier reuse. A misdetection can arise, for instance, if a special bit pattern is used in padding to indicate support for extended signaling—i.e., identifier reuse, and if this patterns happens to be included by chance in a MAC PDU by an entity not supporting the extended signaling support, the receiver of this MAC PDU may incorrectly believe that the sender supports extended signaling.

By way of example, the secondary acknowledgement may be sent by any one or more of the following: (a) using or transmitting/indicating an LCID not used for or otherwise mapped to a Radio Bearer and/or EPS Bearer; or (b) using or transmitting or otherwise indicating a special signature or pattern or string. Of course, it shall be understood that the explicit and implicit mechanisms described herein for acknowledging or secondarily acknowledging the support of identifier reuse also may be used as mechanisms for indicating compatibility with identifier reuse. Such indicating, informing, determining, learning or acknowledging of support for identifier reuse can be extended to, e.g., information about whether LCID reuse is allowed, enabled, desired, used.

As a non-limiting but illustrative example of the teachings herein, consider the following communication sequence between an eNB and a UE, where the intention is to test a function based on reusing LCID 7. The function is denoted as "Control Function X" and it may be, for example a custom function or control not defined in the controlling standard(s). Further, in this example, LCID 7 is the logical channel identifier of that value, as defined by TS 36.321 in Section 6.2.1, which defines 6.2.1 MAC headers for DL-SCH, UL-SCH and MCH. The contemplated sequence includes:

(1) The UE and the eNB support reuse of LCID 7 for Control Function X;

(2) The eNB has configured the UE with SRBs mapped on LCIDs 1 and 2, respectively, and DRBs, Data Radio Bearers, associated with EPS Bearers mapped on LCIDs 3, 4 and 6, respectively;

(3) The eNB and UE determine that, e.g., LCID 7 is not occupied or mapped from or associated with a DRB and/or an EPS Bearer;

(4) The eNB sends a MAC PDU comprising a MAC sub-header with the LCID field set to 7, to indicate to the UE that the eNB supports LCID reuse with LCID 7 for a Control Function X, or the same thing may be done by the UE with respect to the eNB;

(5) The UE receives the MAC PDU from step 4, which comprises a MAC sub-header with the LCID field set to 7, and the UE determines that the eNB supports LCID reuse with LCID 7 for a Control Function X, or the same is done by the eNB with respect to the UE;

(6) The UE sends a MAC PDU comprising a MAC sub-header with the LCID field set to 7 to the eNB to acknowledge the indication that the eNB supports LCID reuse with LCID 7 for a Control Function X and to indicate that also the UE supports LCID reuse with LCID 7 for a Control Function X, or the same is done by the eNB with respect to the UE; and (7) The eNB receives the MAC PDU from step 6, which comprises a MAC sub-header with the LCID field set to 7, and determines that also the UE supports LCID reuse with LCID 7 for a Control Function X, or the same is done by the UE with respect to the eNB.

If steps 5, 6 and 7 are successful, the eNB and UE use LCID 7 for Control Function X. If any of steps 5, 6 or 7 were unsuccessful, the eNB and UE do not use LCID 7 for Control Function X as it was not established that UE and eNB support LCID reuse of LCID 7 for Control Function X.

Of course, the eNB may at any time stop using LCID 7 for Control Function X and configure UE with a DRB and/or EPS Bearer mapped on LCID 7. Such operations can be considered as an example of the eNB reverting from an alternate use of an identifier back to a standard use of that identifier.

If the UE determines that LCID 7 is occupied or mapped from or associated with a DRB and/or EPS Bearer, it correspondingly stops LCID reuse of LCID 7.

If the eNB determines that Control Function X is needed or prioritized, it may be configured to remap the DRB and/or EPS Bearer onto another LCID besides LCID 7 or release the bearer, such as after handover. When LCID 7 is thus unused for its standard purpose, processing may pick up at step 3, above.

To reduce the probability that step 5, 6 or 7 is unsuccessful, the UE and/or eNB may, as described above, prior to steps 5, 6 or 7, indicate a special signature or pattern or string in a special location, message or structure; e.g., in padding or by associating a new meaning to existing or new signaling or procedure.

Further, reused LCIDs can be associated with a Logical Channel Priority and/or Logical Channel Group, LCG, to provide support for consistent Logical Channel Prioritization and Buffer Status Reporting. LC priority and LCG association can be, for example, predefined, or based on a rule, or configured with signaling.

Reuse of LCIDs may be combined with other functionality, such as error correction, concatenation, segmentation, reassembly, reordering, duplicate detection, privacy protection, integrity protection and/or compression, to provide, e.g., a desirable level of reliability and/or security for transport of control and/or data.

Additionally, MAC functionality can be complemented with support for RLC functionality by association of a reserved LCID with a Radio Bearer. Example functionality includes any one or more of error correction through ARQ, concatenation, segmentation, reassembly, reordering, duplicate detection, and/or PDCP functionality, such as through privacy protection, integrity protection, and compression. The association with a Radio Bearer or a Radio Bearer ID can be, for example, predefined, based on a rule or configured with signaling.

Broadly, LCID reuse as contemplated herein provides, for example, for a new control element, control signaling message, container, data element, or logical channel. The newly provided entity may comprise sub-channels, sub-control elements and/or sub-functions. For example, the reuse may be realized via a MAC SDU, which may be a signaling data unit of any structure, or as MAC control element, which also may have any structure. Further, more than one LCID can be repurposed for extended signaling and, reuse may be applied to identifiers other than LCIDs, e.g., Radio Bearer IDs, Secondary Cells or Secondary Cell Groups such as defined for LTE Dual Connectivity may be reused according to the teachings herein. Still further, while the above examples focus on LTE/E-UTRA, the teachings herein have broader applicability and extend to, for example, UTRA. Broadly, the teachings herein provide for, among other things, a new Access Stratum (AS) signaling and/or data transport path in a backwards and forwards compatible fashion.

The teachings reuse normal MAC structure and leverage existing mechanisms for consistent Buffer Status Reporting, BSR, Logical Channel Prioritization, LCP, padding and scheduling. Reused LCIDs can be associated with LCH priority, LCG, etc., for transparent handling by MAC. Additionally, the teachings enable flexible sharing of LCIDs for standard use, i.e., for association/mapping with respect to Radio Bearers and/or EPS Bearers, and for alternate use in extending the signaling capabilities between the network and UEs or other wireless devices. This latter aspect obviates or at least alleviates the need for defining additional LCIDs.

As a further advantage, the teachings herein do not disturb the controlling standard(s) and do not introduce problems with respect to network nodes and wireless devices not compatible with the contemplated identifier reuse, yet they still allow new functions and signaling to be implemented between compatible network nodes and wireless devices. Such signaling or functionality may be used, for example, to test new features or behavior in the real world, using actual network infrastructure during normal, live operations. Moreover, these advantages are gained without the risk that would accompany use of a standards-reserved LCID or other identifier, as identifiers that are formally reserved in the standard may be committed to other uses in future iterations of the standard.

With the above discussion in mind FIG. 5 illustrates an example network node 10 and an associated wireless device 12, which may be a 3GPP UE but is not limited to such examples. Correspondingly, the network node 10 may comprise, e.g., a type of base station or another radio node within the Radio Access Network, RAN, portion of a wireless communication network. In at least one embodiment, the network node 10 comprises an LTE eNB and the wireless device 12 comprises a UE configured for operation in LTE-based networks.

Using the broader terminology defined herein and depending on the particular reference point in use, the network node 10 or the wireless device 12 is a "first wireless communication apparatus" and the other one of them is a "second wireless communication apparatus". The teaching herein will thus be understood as being applicable to the case where first and second wireless communication apparatuses are in communication with each other and where both operate according to a common controlling standard that defines a standard use for one or more identifiers and where, advantageously, the first and second communication apparatuses implement processing whereby the one or more identifiers are put to a non-standard, alternate use, at least temporarily. The alternate, non-standard use is commonly understood as between the apparatuses, so that the alternate use is properly interpreted or managed on both ends of the communications that rely on the alternate use.

Turning back to the diagram, those of ordinary skill in the art will appreciate that FIG. 5 illustrates functional and/or physical circuit arrangements and that the network node 10 and the wireless device 12 generally will include digital processing circuits and associated memory or other computer-readable medium for storing configuration data, operational or working data, and for storing computer program instructions. In at least some of the embodiments contemplated herein, the network-side and device-side functionality is realized at least in part through the programmatic configuration of digital processing circuitry, based on the execution by that circuitry of stored computer program instructions.

One sees from the example that the network node 10 includes a processing circuit 14 and associated memory/storage 16. The memory/storage 16 comprises, for example, one or more types of computer-readable medium, such as a mix of volatile, working memory and non-volatile configuration and program memory or storage. The network node 10 further comprises one or more communication interfaces 18.

The communication interface 18 depends on the nature of the network node 10. In a base station or other radio node example, the communication interface 18 includes a radio transceiver, e.g., pools of radio transmission, reception, and processing circuitry, for communicating with any number of wireless devices 12 in any one or more cells of a wireless communication network. In such example cases, the communication interface 18 includes one or more transmitters and receivers, e.g., cellular radio circuits, along with power control circuitry and associated signal-processing circuitry. Further, in the same scenario, the communication interface 18 may include inter-base-station interfaces and/or backhaul or other Core Network, CN, communication interfaces.

The wireless device 12 may be a cellular radiotelephone—e.g., a smartphone, a feature phone, etc. Alternatively, the wireless device 12 comprises a network adaptor or card, a modem or other such interface device, a tablet or laptop computer, or other device with wireless communication capabilities. Of course, these examples are non-limiting and the wireless device 12 should be broadly understood as a communications transceiver. And, as noted above, the wireless device 12, which also may be referred to as a "wireless communication apparatus", comprises a type of Third Generation Partnership Project, 3GPP, User Equipment or UE.

Regardless of its particular intended use, FIG. 5 illustrates the wireless device 12 as including a communication interface, e.g., a radiofrequency transceiver 20 that includes a receiver 22 and a transmitter 24. The illustrated wireless device 12 further includes one or more processing circuits 26, which include or are associated with one or more memory/storage devices or circuits 28. The memory/storage devices or circuits 28 include, for example, one or more types of computer-readable medium, such as a mix of volatile, working memory and non-volatile configuration and program memory or other storage.

In at least one embodiment, the wireless device 12 provides non-transitory storage for a computer program comprising program instructions that, when executed by the processing circuit(s) 26, configure the wireless device 12 according to the device-side teachings presented herein for identifier reuse and the corresponding extended signaling features. For example, the processing circuit(s) 26 perform the device-side teachings described herein. It will also be understood that, regardless of implementation details, it is contemplated herein that a wireless device 12 implements a method in which it carries out the device-side teachings presented herein for identifier reuse and the corresponding extended signaling features.

Those of ordinary skill in the art will appreciate that the transmitter 24 and/or receiver 22 each may comprise a mix of analog and digital circuits. For example, the receiver 22 in one or more embodiments comprises a receiver front-end circuit—not explicitly shown in FIG. 5—which generates one or more streams of digital signal samples corresponding to antenna-received signal or signals, along with one or more receiver processing circuits. The receiver processing circuits include, for example, baseband digital processing circuitry and associated buffer memory, and operate on the digital samples. Example operations include linearization or other channel compensation, possibly with interference suppression, and symbol demodulation/detection and decoding, for recovering transmitted information.

Figure 6:
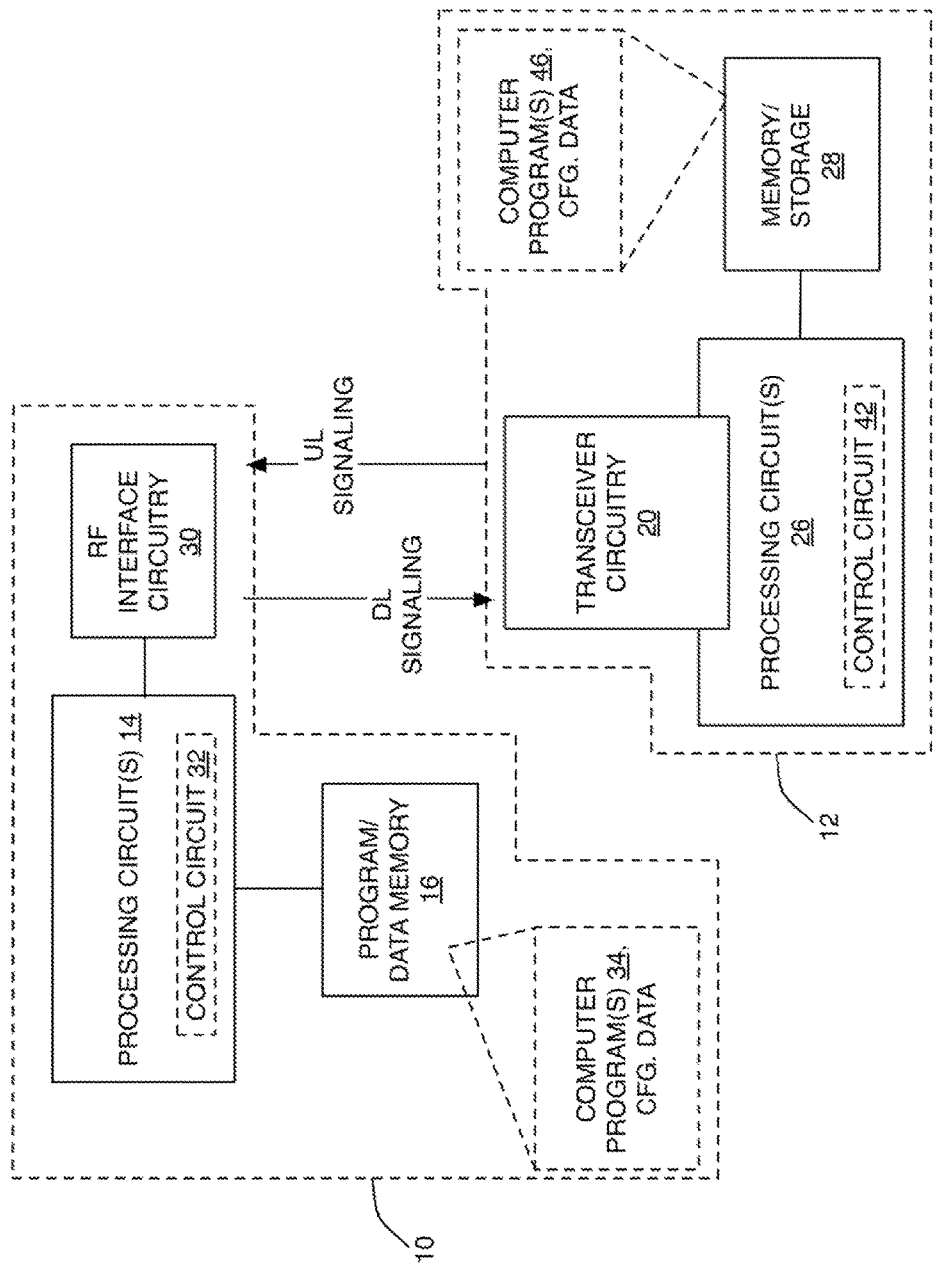
FIG. 6 is a block diagram of example details for the network node and the wireless device introduced in FIG. 5.

FIG. 6 provides fuller example details for the network node 10 and the wireless device 12 in one embodiment, e.g., where the network node 10 is a NodeB or eNB, or other type of base station or radio node. Consequently, the network node 10 in such embodiments includes RF interface circuitry 30, which represents or is included in the communication interface circuitry 18 introduced in FIG. 5. Further, the processing circuits 14, which may comprise one or more microprocessors, DSPs, or other digital processing circuitry, include one or more control circuits 32 which are configured according to the teachings herein, and which also may be referred to as control units, processing circuits, and/or processing units. While not necessarily germane to understanding the functionality disclosed herein for the network node 10, it will be appreciated that the network node 10 may comprise a rack or cabinet of processing circuits using a card/backplane arrangement and may include a host of additional processing circuits/functions not shown in the simplified diagram.

Thus, it will be appreciated that the processing circuit(s) 14 may comprise any one or more computer-based circuits that control at least communication-related processing—e.g., transmit and receive operations through the RF interface circuitry 30. Such circuit(s) 14 may further include a number of other functional circuits not shown, such as user-scheduling circuits to control uplink and/or downlink transmissions among a plurality of wireless devices 12 being supported by the network node 10, and may further include one or more conditions-determination circuits, such as for determining whether and when to activate identifier reuse as taught herein, and for using identifiers in an alternate use sense, when such usage is activated.

The RF interface circuitry 30 may be, for example, a cellular radio interface for communicating with pluralities of wireless devices 12 over a defined air interface according to defined communication protocols. In non-limiting example cases, the network node 10 is configured for operation as a UTRA or E-UTRA base station.

In a similar fashion, the wireless device 12 may be configured to operate according to any one or more wireless communication standards, such as the WCDMA and/or LTE standards just mentioned. Broadly, the wireless device 12 may support more than one Radio Access Technology, RAT, such as may be used in heterogeneous network deployments involving macro cells and base stations and micro cells and base stations, where macro and micro base stations may or may not use the same RAT(s).

The transceiver circuitry 20 therefore may comprise one or more cellular radios, and is shown overlapping the processing circuit(s) 26 to indicate that the receiver 22 and/or transmitter 24 may be implemented in a mix of analog and digital circuits, including baseband processing circuits comprising or otherwise included in the processing circuit(s) 26. In one such example, the processing circuits 26 comprise or include a control circuit 42 that implement device-side operations, including any one or more of determining whether or when to activate identifier reuse, signaling identifier reuse support, detecting whether a base station supports identifier reuse, and carrying out associated functions or signaling when identifier reuse is active. Here, "identifier reuse" denotes the act or process of putting a standards-defined identifier to an alternate, non-standard use on at least a temporary basis.

Figure 7:
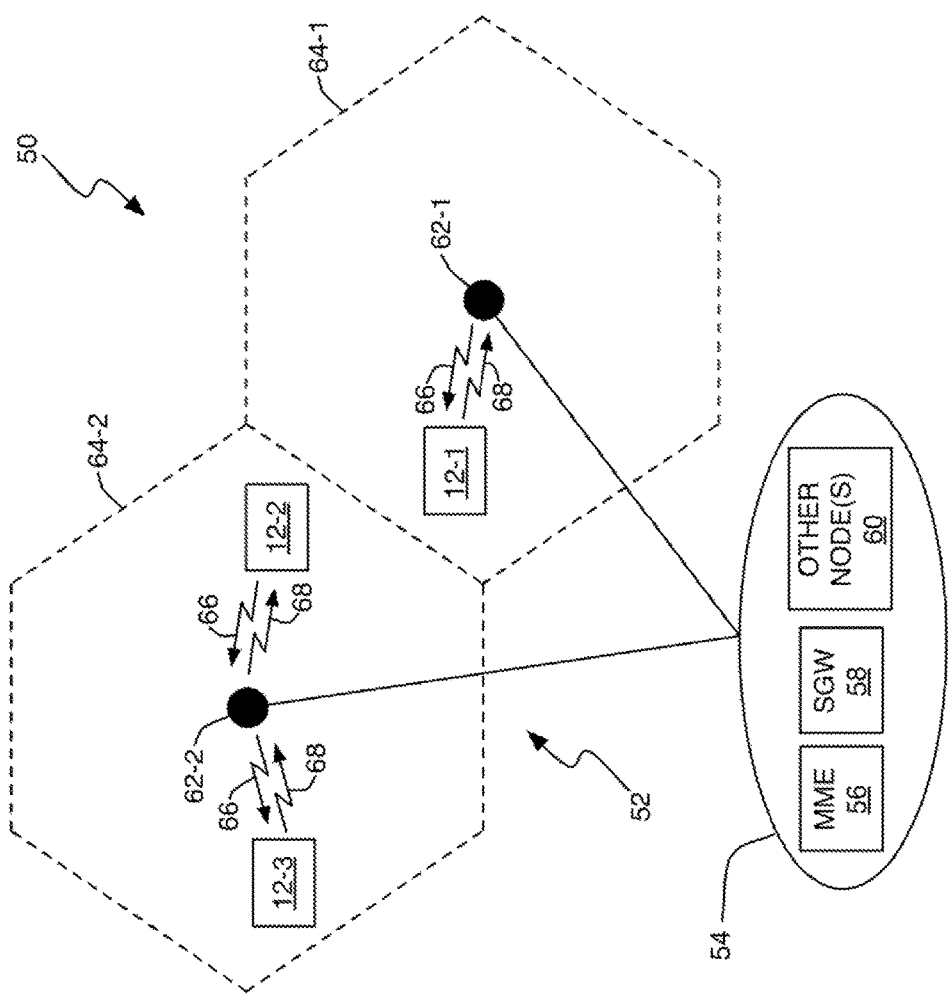
FIG. 7 is a block diagram of one embodiment of a wireless communication network that is configured to operate according to a controlling standard that defines a standard use for certain identifiers, and in which one or more network nodes and one or more wireless devices are configured to use one or more of those identifiers according to a non-standard, alternate use.

FIG. 7 illustrates a homogenous network example, wherein a wireless communication network 50 includes a RAN 52 and a CN 54. The CN 54 includes a Mobility Management Entity or MME 56, a Serving Gateway or SGW 58, and one or more other nodes 60, such as positioning nodes, O&M nodes, OSS nodes, SON nodes, etc. Here, the aforementioned network node 10 is implemented in the RAN 52, e.g., as one of the base stations 62-1 and 62-2. Of course, both such base stations 62-1 and 62-2 may each operate as an instance of the previously described network node 10. Further, note that the reference number "62" without a suffix is used herein for generic reference, when no suffix is needed for clarity.

With that in mind, each base station 62 supports one or more cells 64, e.g., macro or wide-area cells, based on transmitting downlink signals 66 and receiving uplink signals 68. In the example illustration, the base station 62-1 provides a corresponding cell 64-1 and the base station 62-2 provides a corresponding cell 64-2. This arrangement of base stations 62 and cells 64 is of course non-limiting.

In an example case given in the context of FIG. 7, a given base station 62 communicates with a given wireless device 12. The given base station 62 is broadly regarded as being one of first and second wireless communication apparatuses and the given wireless device 12 is regarded as being the other one of the first and second wireless communication apparatuses, where the terms "first" and "second" are merely labels for differentiating between the two apparatuses. Using this terminology, it will be appreciated that putting a standards-defined identifier to an alternate, non-standard use requires a certain methodology or set of processing operations at each of the first and second wireless communication apparatuses. While that methodology may vary in certain detailed respects in dependence on whether the given wireless communication apparatus is a network node 10 or a wireless device 12, the general processing holds in either case.

Figure 8:
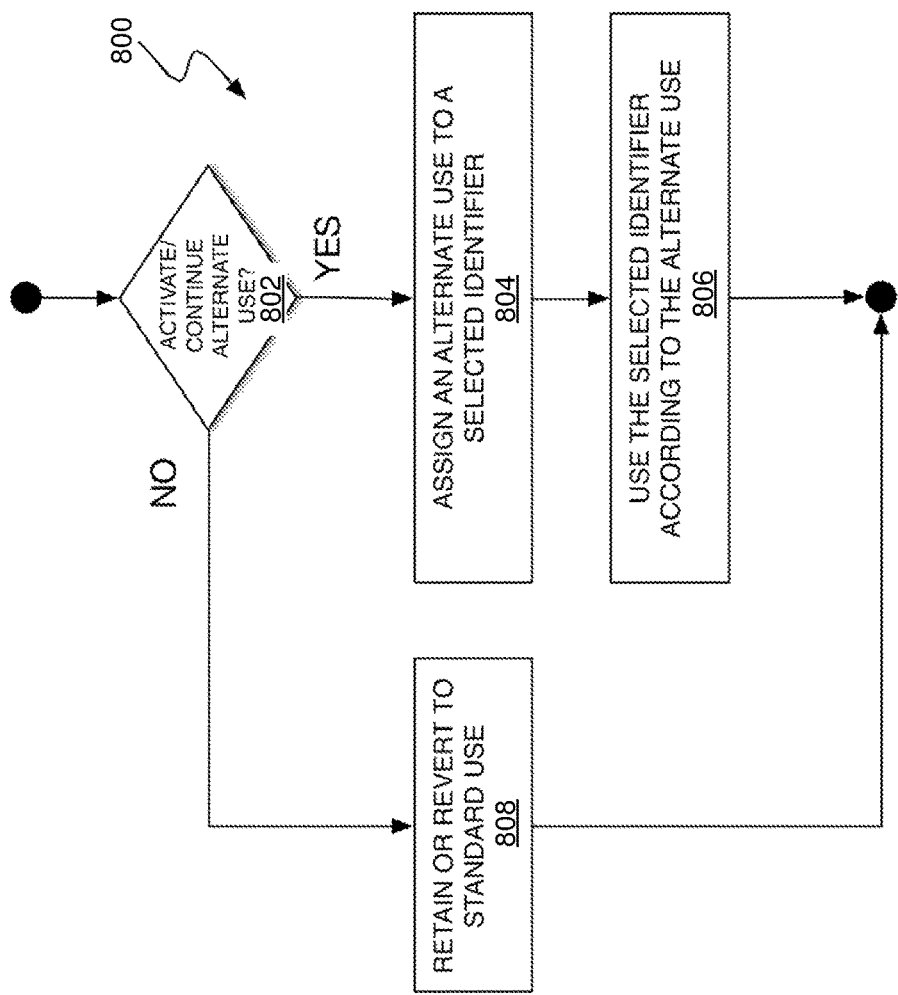
FIG. 8 is a block diagram of one embodiment of a method of using a selected identifier according to a non-standard, alternate use, rather than its standard use, as defined by an applicable controlling standard.

FIG. 8 therefore illustrates an example embodiment of a method 800 implemented by a wireless communication apparatus, such as a network node 10 configured for operation in a wireless communication network 50, or such as a wireless device 12 configured for operation in such a network 50. The method 800 may be implemented at least in part via programmatic configuration, based on the execution of stored computer program instructions. For example, on the network side, the method 800 may be implemented via the execution of the stored computer program 34 by the processing circuit 14, as shown in FIG. 6 for the network node 10. Similarly, on the device side, the method 800 may be implemented via the execution of the stored computer program 46 by the processing circuit 26.

It will also be appreciated that FIG. 8 should not be understood as limiting the teachings herein to a particular processing order. As such, one or more of the illustrated method steps may be performed in an order different from the illustration. Further, the method 800 or included steps therein may be performed in parallel, and, at least on the network-side, may be performed with respect to multiple wireless devices 12. Further, in both the network-side and device-side implementations, the method 800 may be performed in an ongoing sense, e.g., in ongoing or background processing.

According to the illustrated method 800, a first wireless communication apparatus determines whether to activate or continue alternate use for an identifier that is defined by the controlling standard to have a standard use (Block 802). For example, the identifier in question is used according to the controlling standard for identifying logical channels or radio bearers. That is, the first wireless communication apparatus operates according to a controlling standard that defines the identifier in question as being used for identifying logical channels or radio bearers.

The method 800 advantageously permits the use of the identifier for an alternate, non-standard use, at least on a temporary basis. But note here that the processing of Block 802 may differ in dependence on whether the method 800 is being performed in a network node 10 or in a wireless device 12. For example, the decision to "activate" or "continue" using a selected identifier for an alternate non-standard use may differ in dependence on whether the decision is being made by a network node 10 or by a wireless device 12. The network node 10 may, for example, condition the alternate use on determining that the involved wireless device 12 is compatible with such usage, whereas the wireless device 12 may condition the alternate use on determining that the involved network node 10 supports such usage and/or based on receiving signaling from the network 50 indicating that the identifier in question should be used for the alternate purpose.

The method 800 continues, YES from Block 802, with assigning or maintaining an alternate use for the selected identifier, Block 804, and using the selected identifier according to the alternate use, Block 806. Such use may be on an as-needed basis. Of course, if it is determined not to activate or continue the alternate use, NO from Block 802, processing continues with retaining the standard use or reverting to the standard use for the involved identifier, Block 808. Note that the processing of Block 808 does not necessarily mean that the identifier will be actively used in the standard way, but it at least means that the wireless communication apparatus will not regard the identifier as having its alternate use/meaning, and therefore will not use it for alternate-use purposes. Such processing may be done dynamically on an as needed and/or recurring basis. Further, on the network side, such processing may be done on a device-specific basis with respect to multiple wireless devices 12.

In one example of the above method 800 of processing being implemented in a network node 10, the network node 10 includes a communication interface 18 that is configured for transmitting downlink signals to wireless devices 12 and receiving uplink signals from wireless devices 12. Further, the network node 10 includes a processing circuit 14 that is operatively associated with the communication interface 18 and, with respect to at least one wireless device 12, is configured to select an identifier from among a set or range of identifiers that are reserved according to a controlling standard for use by the base station 62 in identifying any one or more of secondary cell groups, secondary cells, radio bearers and logical channels.

As before, this use is referred to as a standard use. The processing circuit 14 is further configured to assign an alternate use to the selected identifier, wherein the alternate use is known by or signaled to the at least one wireless device 12, and to use the selected identifier according to the alternate use in one or more communications with the at least one wireless device 12.

In a further example configuration, the network node 10 omits the selected identifier from consideration for standard use, for so long as the alternate use is active. Correspondingly, the network node 10 subsequently reverts from the alternate use to the standard use for the selected identifier. In at least one such embodiment, the selected identifier is a selected LCID having a value that falls within a range of values reserved for identifying Logical Channels at a MAC layer. In a particular example, the network 50 is configured as a 3GPP EPS and the processing circuit 14 of the network node 10 is configured to refrain from using the selected LCID for mapping EPS bearers onto radio bearers during a time when the alternate use of the selected identifier is active.

In some embodiments, the alternate use comprises one of: use of the selected identifier as a MAC control element or as a signaling identifier. More broadly, the alternate use comprises use of the selected identifier to identify a non-standard control element, control signaling message, data container or element, or logical channel, for extending signaling support between the network and the wireless device beyond that defined by the controlling standard.

As for selecting the identifier to be put to alternate use, in some embodiments the processing circuit 14 of the network node 10 configured to select, as a selected identifier, one among a set or range of identifiers that is not already being used according to its standard use. Further, in the same or other embodiments, the processing circuit 14 is configured to assign the alternate use to the selected identifier, and to use the selected identifier according to the alternate use in the one or more communications with the at least one wireless device 12, in response to determining that the at least one wireless device supports the alternate use. That is, the network node 10 conditions the alternate use at least on the determination that the involved wireless device(s) 12 support the alternate use.

As for implementation of the method 800 on the device-side, an example wireless device 12 includes a communication interface, e.g., transceiver 20, that is configured for receiving downlink signals from base stations 62 in a wireless communication network 50 and transmitting uplink signals to base stations 62 in the wireless communication network 50. The example wireless device 12 further includes a processing circuit 26 that is operatively associated with the communication interface and configured to assign an alternate use to a selected identifier.

Here, the alternate use is known by or signaled to the wireless device 12, and the selected identifier is one among a set or range of identifiers that are reserved according to a controlling standard for use in identifying any one or more of secondary cell groups, secondary cells, radio bearers and logical channels. The processing circuit 26 is further configured to use the selected identifier at least temporarily according to the alternate use in one or more communications with a base station 62. The processing circuit 26 may be further configured to assign the alternate use to the selected identifier and use the selected identifier for the alternate use conditioned on determining that the base station 62 supports the alternate use.

With the above examples in mind, the teachings herein in one aspect provide a new path for data transport and/or Access Stratum, AS, signaling in a manner that is easily exploited with respect to compatible devices or nodes, while retaining backwards compatibility with incompatible nodes or devices. In an example implementation, the new path is provided by reserving and reusing logical channel identifiers, LCIDs, and/or logical channels from the set specified for use with Radio Bearers in 3GPP TS 36.321 V12.4.0, Clause 6.2.1. According to this approach, the teachings herein enable the flexible sharing of LCIDs between logical channels associated with radio bearers and/or EPS bearers, and other signaling or data transport, such as new MAC control elements, etc.

Notably, however, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A network node configured for operation in a wireless communication network, the network node comprising:
   a communication interface configured to transmit downlink signals to wireless devices and receive uplink signals from wireless devices; and
   a processing circuit that is operatively associated with the communication interface and, with respect to at least one wireless device, is configured to:
      select an identifier from among a set or range of identifiers that is reserved according to a controlling standard for use by the network node in identifying any one or more of secondary cell groups, secondary cells, radio bearers and logical channels, which use is referred to as a standard use;
      assign an alternate use to the selected identifier, wherein the alternate use is known by or signaled to the at least one wireless device, and wherein the selected identifier is not mapped to an evolved packet system, EPS, bearer at the time of assignment, wherein the alternate use comprises use of the selected identifier to identify one of a non-standard control element, control signaling message, data container or element and logical channel for extending signaling support between the wireless communication network and the at least one wireless device beyond that defined by the controlling standard;
      omit the selected identifier from consideration for standard use, for so long as the alternate use is active; and
      use the selected identifier according to the alternate use in one or more communications with the at least one wireless device.

2. The network node of claim 1, wherein the processing circuit is configured to subsequently revert from the alternate use to the standard use for the selected identifier.

3. The network node of claim 1, wherein the selected identifier is a selected Logical Channel Identifier (LCID) having a value that falls within a range of values reserved for identifying Logical Channels at a Medium Access Control (MAC) layer implemented between the network node and the at least one wireless device.

4. The network node of claim 3, wherein the wireless communication network is configured as a Third Generation Partnership Project (3GPP) EPS, and wherein the processing circuit is configured to refrain from using the selected LCID for mapping EPS bearers onto radio bearers during a time when the alternate use of the selected identifier is active.

5. The network node of claim 1, wherein the alternate use comprises one of: use of the selected identifier as a MAC control element; and use of the selected identifier as a signaling identifier for a MAC service data unit (SDU).

6. The network node of claim 1, wherein the processing circuit is configured to select, as said selected identifier, one among the set or range of identifiers that is not already being used according to the standard use.

7. The network node of claim 1, wherein the processing circuit is configured to assign the alternate use to the selected identifier, and to use the selected identifier according to the alternate use in the one or more communications with the at least one wireless device, in response to determining that the at least one wireless device supports the alternate use.

8. The network node of claim 1, wherein the network node comprises a base station.

9. A wireless device comprising:
a communication interface configured to receive downlink signals from base stations in a wireless communication network and transmit uplink signals to base stations in the wireless communication network; and
a processing circuit that is operatively associated with the communication interface and configured to:
assign an alternate use to a selected identifier, wherein the alternate use is known by or signaled to the wireless device, and wherein the selected identifier is one among a set or range of identifiers that is reserved according to a controlling standard for use in identifying any one or more of secondary cell groups, secondary cells, radio bearers and logical channels, which use is referred to as a standard use, wherein the selected identifier is not mapped to an evolved packet system, EPS, bearer at the time of assignment, wherein the alternate use comprises use of the selected identifier to identify one of a non-standard control element, control signaling message, data container or element and logical channel for extending signaling support between the first and second wireless communication apparatuses beyond that defined by the controlling standard;
omit the selected identifier from consideration for standard use, for so long as the alternate use is active; and
use the selected identifier according to the alternate use in one or more communications with a base station.

10. The wireless device of claim 9, wherein the processing circuit is configured to assign the alternate use to the selected identifier and use the selected identifier for the alternate use conditioned on determining that the base station supports the alternate use.

11. A method at a first wireless communication apparatus configured for operation in a wireless communication network, the method comprising:
selecting an identifier from among a set or range of identifiers that is reserved according to a controlling standard for use by the first wireless communication apparatus in identifying any one or more of secondary cell groups, secondary cells, radio bearers and logical channels, which use is referred to as a standard use;
assigning an alternate use to the selected identifier, wherein the alternate use is known by or signaled to a second wireless communication apparatus that is in communication with the first wireless communication apparatus, wherein the selected identifier is not mapped to an Evolved Packet System, EPS, bearer at the time of assignment, wherein the alternate use comprises use of the selected identifier to identify one of a non-standard control element, control signaling message, data container or element and logical channel for extending signaling support between the first and second wireless communication apparatuses beyond that defined by the controlling standard;
omitting the selected identifier from consideration for standard use, for so long as the alternate use is active; and
using the selected identifier according to the alternate use in one or more communications with the second wireless communication apparatus.

12. The method of claim 11, further comprising subsequently reverting from the alternate use to the standard use for the selected identifier.

13. The method of claim 11, wherein the selected identifier is a selected Logical Channel Identifier (LCID) having a value that falls within a range of values reserved for identifying Logical Channels at a Medium Access Control (MAC) layer implemented at or between the first and second wireless communication apparatuses.

14. The method of claim 13, wherein the wireless communication network is configured as a Third Generation Partnership Project (3GPP) EPS, and wherein the method further comprises refraining from using the selected LCID for mapping EPS bearers onto radio bearers during a time when the alternate use of the selected identifier is active.

15. The method of claim 11, wherein the alternate use comprises one of: use of the selected identifier as a MAC control element; and use of the selected identifier as a signaling identifier for a MAC service data unit (SDU).

16. The method of claim 11, wherein selecting the identifier from among the set or range of identifiers that is reserved according to the controlling standard comprises selecting, as said selected identifier, one among the set or range of identifiers that is not already being used according to its standard use.

17. The method of claim 11, wherein the method includes performing said steps of assigning and using the selected identifier conditioned on determining that the second wireless communication apparatus supports the alternate use.

* * * * *